United States Patent [19]

Lyle, Jr.

[11] Patent Number: 4,535,625

[45] Date of Patent: Aug. 20, 1985

[54] METHOD OF INCREASING THE VERTICAL RESOLUTION OF WELL LOG DATA

[75] Inventor: W. D. Lyle, Jr., Grapevine, Tex.

[73] Assignee: Mobil Oil Corporation, New York, N.Y.

[21] Appl. No.: 577,093

[22] Filed: Feb. 6, 1984

[51] Int. Cl.³ ............................................. E21B 47/00
[52] U.S. Cl. ...................................... 73/152; 364/422
[58] Field of Search .................... 73/152, 151; 364/422

[56] References Cited

U.S. PATENT DOCUMENTS 4,440,020  4/1984  Boutemy et al. ............... 364/422 X

OTHER PUBLICATIONS

R. E. Kalman, "A New Approach to Linear Filtering and Prediction Problems", Journal of Basic Engineering, vol. 82, pp. 35–45, Mar. 1960.

J. W. Bayless et al., "Application of the Kalman Filter to Continuous Signal Restoration", Geophysics, vol. 35, No. 1, Feb. 1970, pp. 2–36.

M. R. Foster et al., "Optimum Inverse Filters Which Shorten the Spacing of Velocity Logs", Geophysics, vol. XXVII, No. 3, Jun. 1962, pp. 317–326.

Primary Examiner—Jerry W. Myracle
Attorney, Agent, or Firm—Alexander J. McKillop; Michael G. Gilman; Charles J. Speciale

[57] ABSTRACT

Disclosed is a logging technique wherein measured parameters which are inherently weighted average measurement values are inverse filtered to improve the resolution of the measured values. A processing technique is employed, wherein higher resolution values of logged measurements are obtained from information contained in the measurements themselves, and the response function of a logging tool and without emulating a white-noise driven system.

5 Claims, 2 Drawing Figures

METHOD OF INCREASING THE VERTICAL RESOLUTION OF WELL LOG DATA

BACKGROUND OF THE INVENTION

1. Field of the Invention

The present invention relates to a method of improving the quality of data obtained by well logging a borehole and, more particularly, to a method of increasing the vertical resolution of well log data using information derived from logging measurements themselves and a logging tool response function.

2. Discussion of the Prior Art

Logging tools are typically used to measure desired formation parameters of interest at discrete regularly spaced points along a well bore as the tool is moved therealong. At each of the discrete measurement points a measurement is taken and the value thereof recorded at the location (depth point) of the measurement. The measured value is subsequently treated as the true value of the parameter at the measurement location. However, because of the nature of the measurement equipment in the logging tool, in actual practice the true measurement value is not recorded at the measurement location; instead, a numerical weighted average of the desired value and parameter values at adjacent depth points in a vertical interval above and below the measurement location are recorded. Accordingly, a true measurement value of a desired parameter can not be obtained.

SUMMARY OF THE INVENTION

The present invention has, as one of its objectives, the attainment of an increase in the vertical resolution of measured parameter values in borehole logging to thereby obtain a more accurate measurement of the true formation parameter value than is recorded during a logging operation.

This objective is obtained by treating the weighted averaging logging phenomena as a filtering operation, with the filter being specified by the weights associated with the logging operation. In the invention, weighted average logs of a desired formation parameter are obtained and then inverse filtered to remove the weighted average filtering operation at each measurement point to obtain a more accurate estimate of the true formation parameter value. The obtained weighted average log data is subject to a recursive processing technique in which new information contained in each log measurement is determined and used to obtain higher resolution measured parameter values. The higher resolution parameter values are determined from information contained in the original measurements themselves and the response function of the logging tool, without requiring emulation of a system driven by white noise which is used in other inverse filtering techniques, such as Kalman filtering.

The above and other objects, advantages and features of the invention will be more readily understood from the following detailed description of the invention, which is provided in connection with the accompanying drawings.

DETAILED DESCRIPTION OF THE INVENTION

Figure 1:
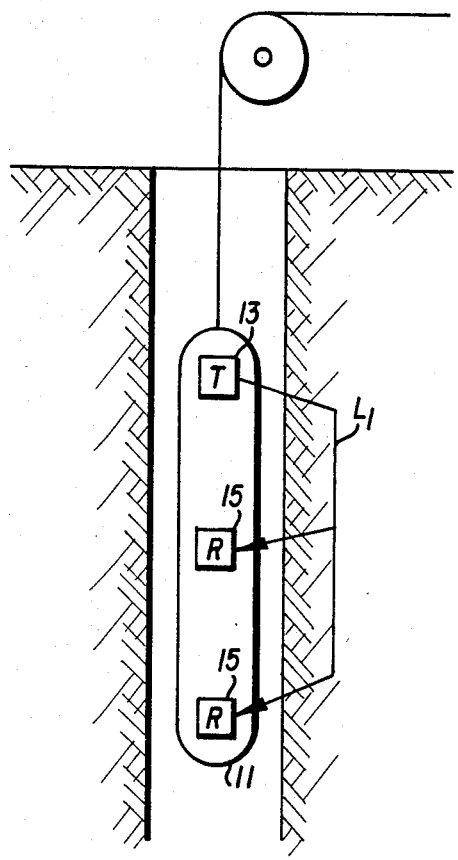
FIG. 1 illustrates the apparatus typically used for well bore logging.

FIG. 1 illustrates the apparatus typically employed in well logging. A logging tool 11 is lowered into a borehole and then retrieved. As the tool is moved along the borehole, e.g., pulled up, a series of measurements are taken at discrete regularly spaced points by, for example, an acoustic transmitter 13 and one or more receivers 15. The measured values are recorded as a function of borehole depth by a recorder which produces a log of the measured parameter. Because of the path length $L_1$ between the transmitter 13 and receivers 15, a measured parameter value at any point along the borehole is a measurement of an average weighted parameter value along the path $L_1$.

The filtering which inherently occurs to produce the weighted average logs can be expressed as follows:

$$Y_j = N_j + \sum_{k=-L}^{L} h_{j-k} X_{j-k} \tag{1}$$

where $Y_j$ = log value recorded at point j
$N_j$ = measurement noise at point j
$X_l$ = value of formation parameter at point l
$h_l$ = filter coefficient associated with the parameter value at point l
$2L+1$ = filter length In Equation (1) the filter length is specified to be an odd number as a matter of convenience. If the number of h values is an even number, then it will be assumed that an additional h value of zero is included to ensure that the filter length is odd. The results are not changed when this is done, and doing so avoids the necessity of treating the even and odd number coefficients separately.

Equation (1) can be completely written in matrix notation as:

$$Y_j = H_j^T M_j + N_j \tag{2}$$

where the superscript T denotes matrix transponse, and $$H_j = \begin{bmatrix} h_{j+L} \\ \cdot \\ \cdot \\ \cdot \\ h_j \\ \cdot \\ \cdot \\ \cdot \\ h_{j-L} \end{bmatrix} \tag{3}$$

and $$M_j = \begin{bmatrix} X_{j+L} \\ \cdot \\ \cdot \\ X_j \\ \cdot \\ \cdot \\ X_{j-L} \end{bmatrix} \tag{4}$$

The $H_j$ of Equation (3) represents the tool response function at point j along the borehole and will be herein referred to as the tool response function vector; $M_j$ is a matrix of the true parameter measurement values centered about point j along the borehole; and $N_j$ is the measurement noise at point j.

The invention employs the concept of inverse filtering the logged data to determine an estimate $(X_j)$ of the true parameter value $\{X_j\}$ at each point (j) of interest in some interval along the wellbore for which measurements $Y_j$ are available.

Numerous techniques could be applied to deal with this problem. The modern and more powerful technique available to treat the problem is statistical estimation theory. Using this approach, the sequence of values of the true formation parameter $\{X_j\}$ are treated as belonging to a random process. In statistical estimation theory, an estimator that produces the required estimate is designed by minimizing some function of the error between the estimated value and the true value. Mathematical tractability of the minimization problem has, in most cases of interest, restricted the error function to be the square of the error, which leads to a minimum mean-square or least-squares estimate. Additionally, the least-squares error estimator has the advantage that only a knowledge of the first-and-second-order statistics of the process $\{X_j\}$ are required for its determination.

Kalman introduced an approach to linear mean-square estimation problems involving complicated systems that made possible recursive processing of the measurement data in a computationally effecient manner. R. E. Kalman, "A New Approach to Linear Filtering and Prediction Problems", *Journal of Basic Engineering*, Vol. 82, pp. 35–45, March 1960. In recursive processing techniques, past measurements do not have to be stored in the processor in order to compute the present estimate. The technique introduced by Kalman, now known as Kalman filtering, exploits the idea that arbitrary random processes may be represented up to second-order statistical properties as the output of a linear system driven by white-noise. Furthermore, a set of difference equations for discrete systems, as considered here, are used to describe the linear system. Such a set of equations written in vector notation is:

$$\theta_k = \Phi_{k-1}\theta_{k-1} + F_{k-1}U_{k-1} \tag{5}$$

Measurements of the system output are described by a measurement equation $$Z_k = J_k\theta_k + \lambda_k \tag{6}$$

where $\Phi$, $F$, and $J$ are matrices, $U_{k-1}$ is a possibly vectorvalued white-noise process, and $\lambda_k$ is the measurement noise. $\theta_k$ is known as the system state vector whose elements are the system state variables which describe the behavior of the system. Kalman showed that the estimate $\theta_k(+)$ of $\theta_k$ is given by:

$$\theta_k(+) = \theta_k(-) + G_k[Z_k - J_k\theta_k(-)] \tag{7}$$

where $$\theta_k(-) = \Phi_{k-1}\theta_{k-1}(+) \tag{8}$$

and is the estimate of $\theta_k$ produced by the filter before the measurement $Z_k$ is processed. $G_k$ in Equation (7) is the filter gain matrix calculated according to formulas well known in the literature.

The Kalman theory has been applied to the well log inverse problem. See J. W. Bayless et al "Application of the Kalman Filter to Continuous Signal Restoration", *Geophysics*, Vol. 35, No. 1, Feb. 1970, pp. 2–36. A discussion of the Kalman approach to the well log inverse problem is included here because the measurement processing technique used in the invention is structured similar to the Kalman filter in order to use its inherent computational simplicity. However, there are significant differences that are most easily explained by describing the Kalman approach to the inverse problem. By doing this, the difficulty in reducing the Kalman approach to practice is made apparent, as well as how the present method differs from an approach using the Kalman filter. The presentation below is the discrete version of the continuous Kalman filter originally presented in the Bayless et al article referenced above.

Application of the Kalman theory to the inverse filter problem requires that the problem be formulated in such a way that Equation (5) applies. Doing so allows dirct application of Equation (7), which in turn allows calculation of $X_j$ as explained below. The formation parameter process $\{X_j\}$ is modeled by the vector equations:

$$W_k = A_{k-1}W_{k-1} + B_{k-1}U_{k-1} \tag{9}$$

and $$X_{k+1} = L_k^T W_k \tag{10}$$

where $W_k$ is the linear system state vector, $L_k$ is a matrix appropriately dimensioned so that the matrix product of Equation (10) yields a scalar, and $U_k$ is a white-noise process. The output $X_{k+1}$, as opposed to $X_k$, is used in Equation (10) to simplify the formulation of the problem. The process generated by Equations (9) and (10) is equivalent to the true parameter process in the sense that the generated process has the same first- and second-order statistics, and it is important to emphasize that these first- and second-order statistics are assumed known in the Kalman theory.

Effects of the actual measuring or well logging operation are modeled by a measurement equation and a system equation, but with the system in this case being driven by the process $\{X_j\}$, as opposed to a white-noise process. The system equation is:

$$M_k = C_{k-1}M_{k-1} + D_{k-1}X_{k+L} \tag{11}$$

and the measurement equation is Equation (2), that is, $$Y_k = H_k^T M_k + N_k \tag{2}$$

Inspection of Equation (5) shows that the equation applies directly, if the terms in Equation (5) are expressed as:

$$\theta_k = \begin{bmatrix} M_k \\ W_k \end{bmatrix} \tag{12}$$

$$\Phi_{k-1} = \begin{bmatrix} C_{k-1} & D_{k-1}L_k^T \\ 0 & A_{k-1} \end{bmatrix} \tag{13}$$

-continued $$J_k = [H_k^T, \underline{0}] \quad (14)$$

$$\lambda_k = N_k \quad (15)$$

and $$F_{k-1} = \begin{bmatrix} \underline{0} \\ B_{k-1} \end{bmatrix} \quad (16)$$

where $\underline{0}$ is the symbol used for a matrix of zeros with dimensions depending on the equation in which it appears.

Application of Equation (7) then yields an estimate $\theta_k(+)$ of $\theta_k$, from which:

$$X_{k+L} = L_k^T W_k(+) \quad (17)$$

using Equation (10). The above results are theoretically correct, but reduction of the theoretical results to practice is extremely difficult. One problem is that in the Kalman theory, the first- and second-order statistics of the process $\{X_j\}$ are assumed known. However, in a logging environment, this is rarely the case, and this necessitates estimation of the statistics from the recorded data $\{Y_j\}$. Furthermore, as the authors of the Bayless et al article point out, the matrices A and B of Equation (9) must be known in order to process the data. Lack of practical techniques for determination of the required statistics of $\{X_j\}$ and numerical evaluation of the matrices A and B have rendered the Kalman filter impractical when applied to the well log inverse problem. The present invention is not a practical technique for the determination of the above-mentioned quantities, but rather is a new approach to the inverse problem that avoids the necessity of such determinations, while at the same time retaining the computational advantages of the Kalman filter.

The above mentioned difficulties in practically applying the Kalman filter can be circumvented in a way that leads to a computationally efficient, recursive processing technique which is employed in the method of the invention by utilizing the theory of innovations. The innovations of a measurement $Y_k$ are the new information contained in the measurement that was not already contained in previous measurements. Kailath, "Lectures on Linear Least Squares Estimation", CISM Courses and Lectures, No. 140, International Centre for Mechanical Sciences, Springer-Verlag, New York 1976, and others, showed in a series of publications that the Kalman filter calculates the innovations as part of the filtering. The innovations term in the Kalman filter estimate of Equation (7) is in fact given by:

$$\text{Innovations of } Z_k = Z_k - J_k \theta_k(-) \quad (18)$$

The point of Kailath's work is that for problems in which the Kalman filter is unsuited, it is still possible to obtain a recursive estimator if a convenient way of recursively determining the innovations in the measurements is obtained. This idea is discussed in the Kailath et al article mentioned above.

The present invention uses a data processing technique which provides a way of recursively determining the measurement innovations, while at the same time avoiding the introduction of undetermined matrices, such as A and B described above. Furthermore, the technique does not require knowledge of the first- and second-order statistical averages of the process $X_j$.

Other quantities that play the role of these averages are defined and used in the technique, and these quantities can be calculated directly from the measurements themselves and a tool response function.

The processing technique of the invention processes data in a similar manner as the Kalman filter, thus assuring that the estimates are calculated in a computational efficient manner. In particular, the gain term $G_k$ is determined as in the Kalman theory.

Before presenting the processing technique employed in the invention in the form of a series of equations, the notation used is defined as follows:

$$M_i = \begin{bmatrix} X_{i+L} \\ \vdots \\ X_i \\ \vdots \\ X_{i-L} \end{bmatrix} \quad (19)$$

= Vector of true formation values that contribute to measurement $Y_i$ $H_i$ = tool response function vector defined by Equation (13)

$$M_i(-) = \begin{bmatrix} X_{i+L}(-) \\ \vdots \\ X_i(-) \\ \vdots \\ X_{i-L}(-) \end{bmatrix} \quad (20)$$

= Estimate of $M_i$ before measurement $Y_i$ is processed $$M_i(+) = \begin{bmatrix} X_{i+L}(+) \\ \vdots \\ X_i(+) \\ \vdots \\ X_{i-L}(+) \end{bmatrix} \quad (21)$$

= Estimate of $M_i$ after measurement $Y_i$ is processed $V_k = E(N_k)^2$ = noise power of measurement noise $\quad (22)$ $Q_k = E[Y_k - N_k]^2$ = signal power $\quad (23)$ $$\Phi = \begin{bmatrix} 0 \cdots & 0 \\ & 0 \\ I_{L-1} & \vdots \\ & 0 \end{bmatrix} \quad (24)$$

= $L \times L$ matrix with row one and column $L$ containing all zero elements. $I_{L-1}$ is an $(L-1) \times (L-1)$ identity matrix $$\begin{bmatrix} 1 \\ 0 \\ \vdots \\ 0 \end{bmatrix} = \text{column vector with } L \text{ rows containing a single non-zero entry in row one} \quad (25)$$

$$P_k(-) = E[M_k - M_k(-)][M_k - M_k(-)]^T \quad (26)$$

$$= L \times L \text{ covariance matrix defined as indicated}$$

$$P_k(+) = E[M_k - M_k(+)][M_k - M_k(+)]^T \quad (27)$$

$$= L \times L \text{ covariance matrix defined as indicated}$$

and $$[0, 0, \ldots 0, 1] = \text{row vector with } L \text{ columns containing a single non-zero entry in column } L \quad (28)$$

The symbol E used in Equations (22), (23), (26) and (27) is the statistical expectation operator.

Using the above notation, the recursive inverse filtering technique used in the invention is given by Equations (29)–(34) below.

$$M_k(-) = \Phi M(+)_{k-1} + \begin{bmatrix} 1 \\ 0 \\ \vdots \\ 0 \end{bmatrix} Y_{K+L} \quad (29)$$

$$P_k(-) = \Phi P(+)_{k-1} \Phi^T + Q_{k+L} \begin{bmatrix} 1 & 0 & \ldots & 0 \\ 0 & & & \vdots \\ \vdots & & & \\ 0 & \ldots & & 0 \end{bmatrix} \quad (30)$$

$$G_k = P_k(-)H_k[H_k^T P_k(-)H_k + V_k]^{-1} \quad (31)$$

$$M_k(+) = M_k(-) + G_k[Y_k - H_k^T M_k(-)] \quad (32)$$

$$P_k(+) = [I_L - G_k H_k^T] P_k(-) \quad (33)$$

$$X_{k-L} = [0, \ldots, 0, 1] M_k(+) \quad (34)$$

The matrix appearing on the right-hand side of Equation (30) is an LxL matrix containing a single non-zero element of unit value in the first row and first column.

Actual filtering of the log data requires that the processing technique be initialized. One choice for the initialization that has been found to work in practice is $$P(-)_{1+L} = I_L \begin{bmatrix} Q_{1+2L} \\ \vdots \\ Q_{1+L} \\ \vdots \\ Q_1 \end{bmatrix} \quad (35)$$

and $$M(-)_{1+L} = \begin{bmatrix} Y_{1+2L} \\ \vdots \\ Y_{1+1} \\ \vdots \\ Y_1 \end{bmatrix} \quad (36)$$

Using the above initialization, the first measurement point processed is $Y_{1+L}$ and the final measurement point processed is $Y_{k-L}$, where k is the number of measurement points. The final estimated inverse point is seen to be $X_{k-2L}$.

Regardless of how the processing technique is initialized, the quantities $Q_k$ and $V_k$ are required for actual data processing. There are numerous approaches to obtaining first- and second-order averages from a single data record. J. S. Bendat and A. G. Peirsol, *RANDOM DATA: Analysis and Measurement Procedures*, Wiley-Interscience, N.Y. (1971) discusses how this can be done from single records of both stationary and nonstationary processes. However this averaging is done, the second-order average of the data record denoted by $\sigma_k^2$ is equal to $$\sigma_k^2 = Q_k + V_k \quad (37)$$

Unless there is evidence to the contrary, the measurement noise is assumed to be zero-mean with constant variance. Thus, the $V_k$ is, as a practical matter, taken to be a constant for all k. Since the quantity $\sigma_k^2$ in Equation (37) is known from the data, $Q_k$ can be determined in at least two ways. First, based on calculated tool measurement resolving accuracy, a numerical estimate of V can be obtained. Using this numerical value, Equation (37) is solved for $Q_k$. Second, the signal-to-noise ratio approach can be used where an estimate of the recorded data signal-to-noise ratio is made. This estimate denoted by R yields the equation:

$$R = Q_k / V \quad (38)$$

which can be solved for $Q_k$.

Once $Q_k$ and V are obtained, Equations (35) and (36) are initialized and the date is recursively processed by the algorithm defined by Equations (29)–(34).

Figure 2:
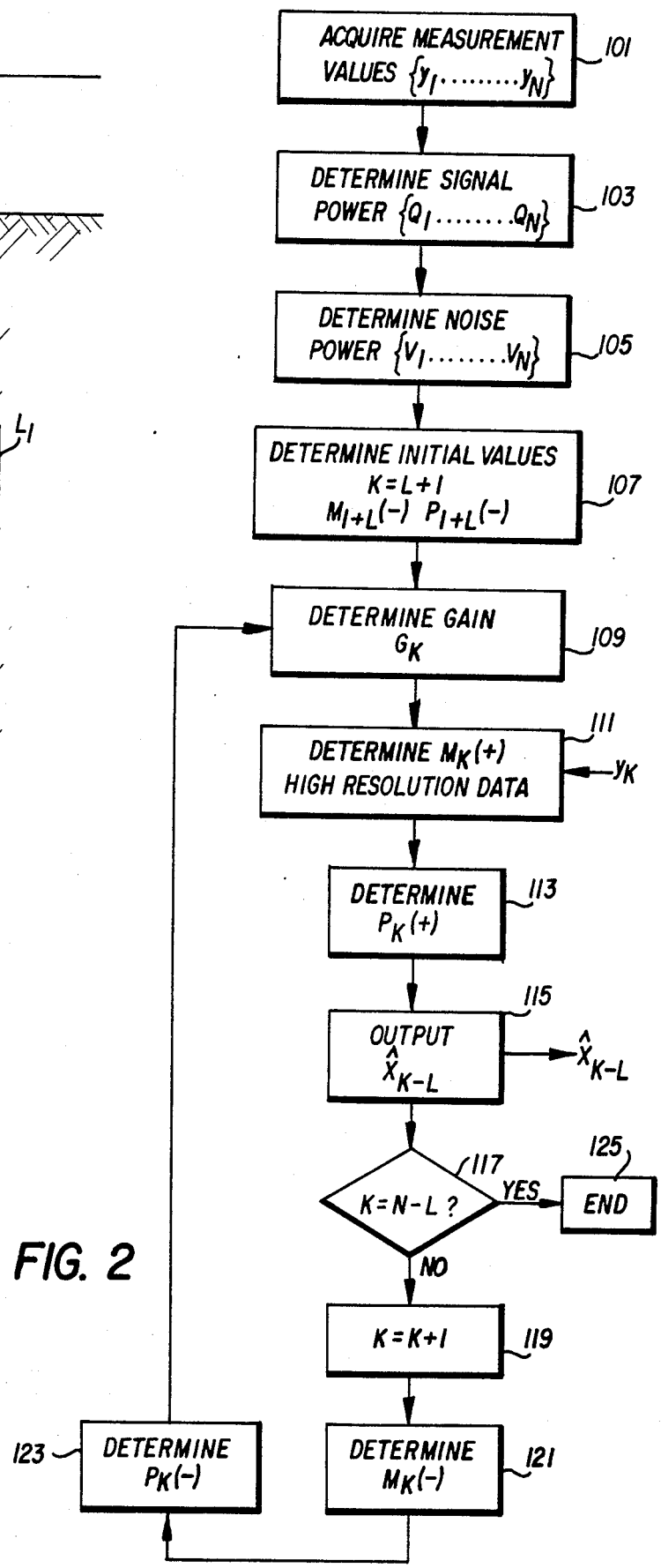
FIG. 2 illustrates in flowchart form a program for implementing the method of the invention on a digital computer.

The entire methodical procedure of the invention can be performed on a general purpose computer performing the program illustrated in flow chart format in FIG. 2.

In the first step 101, all measurement values $Y_1 \ldots Y_N$ taken from well logs are acquired and input, following which signal power $Q_1 \ldots Q_N$ and noise power $V_1 \ldots V_N$ values are determined in steps 103, 105, respectively. Initial processing values are then determined in step 107. The counter K is initialized as L+1, an estimated true measurement vector value $M_{1+L}(-)$ is determined in accordance with Equation (36), and an initial power vector value $P_{1+L}(-)$ is determined in accordance with Equation (35). The gain vector value $G_k$ is then determined in step 109 using Equation (31). In step 111, input value $Y_k$ is selected and the matrix of newly estimated measurement values $M_k(+)$ is calculated using Equation (32). Thereafter, in step 113, a newly estimated power vector value $P_k(+)$ is calculated using Equation (33). In subsequent step 115, a determined measurement value $X_{k-L}$ is output in accordance with Equation (34). Thereafter, in step 117, a determination is made whether all measurements in the log have been processed (k=N−L). If not, the k value is incremented in step 119, the value $M_k(-)$ is redetermined according to Equation (29) in step 121 and the value $P_k(-)$ is redetermined according to Equation (30) in step 123. Thereafter, the procedure again executes step 109 and repeats until all log data is processed, as determined in step 117, after which the procedure terminates in step 125.

It should be appreciated that step 115 produces log values corresponding to measured log values which have been inverse filtered to minimize the averaging effects discussed above.

While a preferred embodiment of the invention has been described and illustrated, numerous modifications can be made without departing from its spirit and scope. Accordingly, the invention is not limited by the foregoing description, but is only limited by the scope of the appended claims.

I claim:

1. A method of increasing the vertical resolution of well log data, comprising the steps of:
    moving a well logging tool relative to a well bore and taking parameter measurements at a plurality of discrete points along the well bore to produce a log of said parameter measurements, said parameter measurements being weighted average measurements of true parameter values;
    inverse filtering the data contained in said log to reduce the effects of weighted averaging on parameter measurements, said inverse filtering operation determining higher resolution estimates of said logged measurements from information contained in said measurements, and the response function of said logging tool and without emulating a white-noise driven system;
    producing a log of said inverse filtered data which more accurately reflects said true parameter values.

2. A method as in claim 1, wherein said inverse filtering step includes the steps of determining for a plurality of measurement points a higher resolution data value from a previous estimate of said higher resolution data value and from new information contained in a measured value corresponding thereto which was not present in previous measured values corresponding to different measurement points.

3. A method as in claim 1, wherein said inverse filtering includes the steps of:
    (a) determining signal power ($Q_1 \ldots Q_N$) and noise power ($V_1 \ldots V_N$) values from said measured values,
    (b) determining a power vector value ($P_k(-)$) and an estimated higher resolution measured data ($M_k(-)$) vector value from said signal power ($Q_1 \ldots Q_N$) values and a measured value ($Y_k$) respectively,
    (c) determining a gain vector value ($G_k$) from a noise power value ($V_k$), said power vector value ($P_k(-)$) and a logging tool response vector value ($H_k$),
    (d) determining a higher resolution vector value ($M_k(+)$) from said estimated higher resolution vector ($M_k(-)$) value and innovation information determined from said gain vector value ($G_k$), said measured value ($Y_k$), said tool response vector value ($H_k$), and said initial estimated higher resolution vector value ($M_k(-)$), and
    (e) extracting a higher resolution measurement value X from said higher resolution vector value ($M_k(+)$), where k is initialized as L+1 and L represents a particular beginning measurement point.

4. A method as in claim 3, further comprising the steps of:
    (f) determining new power vector value $P_k(+)$ from a previously determined power vector value ($P_k(-)$), said tool response vector value ($H_k$) and said gain vector value ($G_k$);
    (g) incrementing the value k by one;
    (h) determining estimated higher resolution vector values ($M_k(-)$) from previously determined higher resolution vector values ($M_k(+)$) and a measured value ($Y_k$);
    (i) determining an estimated power vector value ($P_k(-)$) from a previously determined power vector value ($P_{k-1}(+)$) and a signal power ($Q_{k+L}$) value;
    (j) determining a new gain vector value ($G_k$) from a noise power ($V_k$) value, a previously estimated power vector value ($P_k(-)$) and a logging tool response vector value ($H_k$);
    (k) determining a new higher resolution vector value ($M_k(+)$) from said estimated higher resolution vector value ($M_k(-)$) and innovation information determined from a new gain vector value ($G_k$), a measured value ($Y_k$), a tool response vector value ($H_k$) and an estimated higher resolution vector value ($M_k(-)$);
    (l) extracting new higher resolution measurement values X from said new higher resolution vector value ($M_k(+)$); and
    (m) repeating steps (f) through (k) until all new higher resolution vector values ($M_k(+)$) are determined corresponding to each of said parameter measurements.

5. A method as in claim 4, wherein the determined values are determined in accordance with the following relationships:

$$M_k(-) = \Phi M(+)_{k-1} + \begin{bmatrix} 1 \\ 0 \\ \vdots \\ 0 \end{bmatrix} Y_{K+L}$$

$$P_k(-) = \Phi P(+)_{k-1} \Phi^T + Q_{k+L} \begin{bmatrix} 1 & 0 & \ldots & 0 \\ 0 & & & \\ \vdots & & & \vdots \\ 0 & & \ldots & 0 \end{bmatrix}$$

$$G_k = P_k(-)H_k[H_k^T P_k(-)H_k + V_k]^{-1}$$

$$M_k(+) = M_k(-) + G_k[Y_k - H_k^T M_k(-)]$$

$$P_k(+) = [I_L - G_k H_k^T]P_k(-)$$

-continued $$P^{(-)}_{1+L} = I_L \begin{bmatrix} Q_{1+2L} \\ \vdots \\ Q_{1+L} \\ \vdots \\ Q_1 \end{bmatrix}$$

and $$M^{(-)}_{1+L} = \begin{bmatrix} Y_{1+2L} \\ \vdots \\ Y_{1+1} \\ \vdots \\ Y_1 \end{bmatrix}$$

where $$\Phi = \begin{bmatrix} 0 & \cdots & 0 \\ & & 0 \\ I_{L-1} & & \vdots \\ & & 0 \end{bmatrix}$$

= $L \times L$ matrix with row one and column $L$ containing all zero elements; $I_{L-1}$ is an $(L-1) \times (L-1)$ identity matrix.

* * * * *